United States Patent
Chung et al.

(10) Patent No.: US 9,414,462 B1
(45) Date of Patent: Aug. 9, 2016

(54) INDUCTIVE POWER TRANSFER FOR DRIVING MULTIPLE ORGANIC LIGHT EMITTING DIODE PANELS

(71) Applicant: City University of Hong Kong, Kowloon (HK)

(72) Inventors: Shu Hung Henry Chung, Mid-levels (HK); Rui Zhou, New Territories (HK); Rui hong Zhang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 14/667,246

(22) Filed: Mar. 24, 2015

(51) Int. Cl.
*H05B 33/08* (2006.01)
*H02J 5/00* (2016.01)

(52) U.S. Cl.
CPC ............ *H05B 33/0896* (2013.01); *H02J 5/005* (2013.01)

(58) Field of Classification Search
CPC . H05B 33/0815; H05B 33/0803; H02J 5/005; H02J 7/025
See application file for complete search history.

(56) References Cited

U.S. PATENT DOCUMENTS

| | | | |
|---|---|---|---|
| 2009/0290332 A1* | 11/2009 | Jacobs | F21V 23/02 362/183 |
| 2011/0012936 A1* | 1/2011 | Kim | H05B 33/0809 345/690 |
| 2014/0256188 A1* | 9/2014 | Manahan | H02J 5/005 439/660 |
| 2014/0265884 A1* | 9/2014 | Chung | H05B 33/0821 315/185 R |

OTHER PUBLICATIONS

K. I. Hwu, et al., "Applying One-Comparator Counter-Based Sampling to Current Sharing Control of Multichannel LED Strings," IEEE Trans. Ind. Appl., vol. 47, No. 1, pp. 376-386, Jan./Feb. 2011.
Q. Hu, et al., "LED driver circuit with series-input-connected converter cells operating in continuous conduction mode," IEEE Trans. Power Electron., vol. 25, No. 3, pp. 574-582, Mar. 2010.
K. I. Hwu, et al., "A simple current-balancing converter for LED lighting," in Proc. IEEE Appl. Power Electron. Conf., 2009, pp. 587-590.

(Continued)

*Primary Examiner* — Jany Richardson
(74) *Attorney, Agent, or Firm* — Amin, Turocy & Watson, LLP

(57) ABSTRACT

An inductive power transfer system for driving multiple organic light emitting diode panels is provided. In an aspect, the system includes a plurality of transformers electrically coupled to one another in a daisy-chain formation and a plurality of power modules operatively coupled to respective ones of the plurality of transformers. Respective output voltages of the plurality of transformers are configured to provide power to organic light emitting diode panels in response to respective ones of the organic light emitting diode panels being coupled to respective ones of the plurality of the power modules via respective detachable transformers mechanically and operatively coupled to the respective ones of the organic light emitting diode panels. The system further includes a single switching module operatively coupled to the plurality of transformers and configured to drive the inductive power transfer system with a single output current.

20 Claims, 10 Drawing Sheets

(56) References Cited

OTHER PUBLICATIONS

R. Zhang, et al., "Transformer-Isolated Resonant Driver for Parallel Strings With Robust Balancing and Stabilization of Individual LED Current," IEEE Trans. Power Electron., vol. 29, issue. 7, pp. 3694-3708, Jul. 2014.

R. Zhou, et al., "Inductive power transfer system for driving multiple OLED lighting panels," Energy Conversion Congress and Exposition (ECCE), 2014 IEEE, vol. No. pp. 5265,5272, Sep. 14-18, 2014.

* cited by examiner

INDUCTIVE POWER TRANSFER FOR DRIVING MULTIPLE ORGANIC LIGHT EMITTING DIODE PANELS

TECHNICAL FIELD

This application generally relates to inductive power transfer for driving multiple organic light emitting diode (OLED) panels.

BACKGROUND

Recent advances in material chemistry have enabled the use of white OLEDs in lighting devices for next generation artificial lighting. One company, for instance, announced in May 2013 a white OLED with an encouraging luminous efficiency of 114 lm/W, a light emitting area of 1 cm$^2$, and a lifetime of 100,000 hours. OLEDs offer several merits including two-dimensional (surface) illumination, low operating temperature, and environmentally clean material makeup. In addition, OLEDs have a slim form factor, they are lightweight, and flexible. However, OLED designs that maintain wired power drivers or otherwise maintain contact during the provision of power because water have drawbacks.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
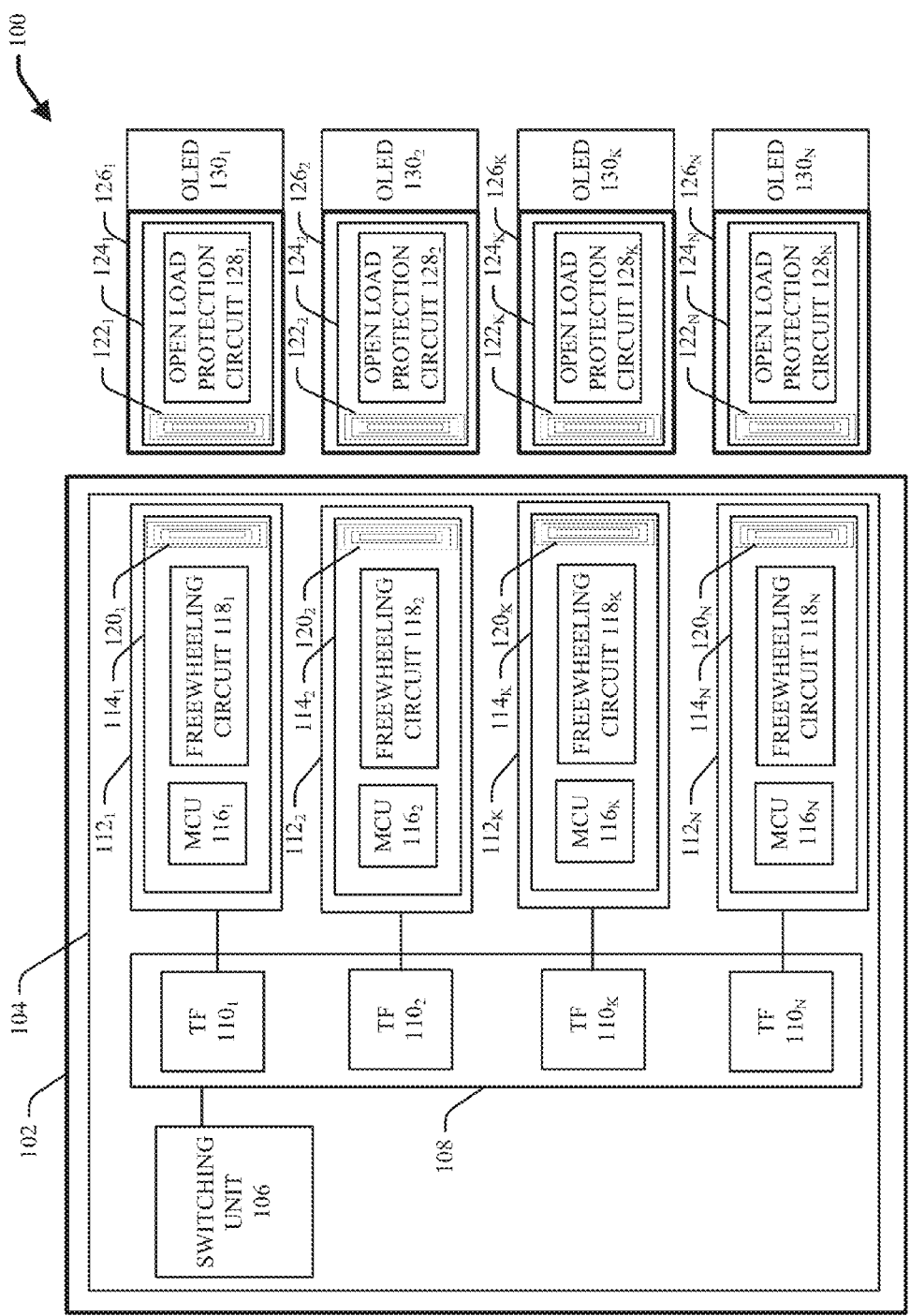
FIG. 1 illustrates an example inductive power transfer system for driving multiple OLED panels using a single switch in accordance with various aspects and embodiments described herein.

The subject embodiments are described with reference to the drawings, wherein like reference numerals are used to refer to like elements throughout. In the following description, for purposes of explanation, numerous specific details are set forth in order to provide a thorough understanding of the subject embodiments. It may be evident, however, that the subject embodiments can be practiced without these specific details. In other instances, well-known structures and components are shown in block diagram form in order to facilitate describing the subject embodiments.

By way of introduction, the subject matter described in this disclosure relates to an inductive power transfer system for driving multiple OLED lighting panels. To advance the interface and experience to users, use of contactless power drivers for driving OLEDs is an attractive approach because they provide safe and water operation and low maintenance. The system includes a power transfer device configured to provide power to a plurality of OLED panels via electromagnetic induction. The OLED panels themselves are detachable and interchangeable. The power transfer device includes a plurality of power modules respectively including primary transformer windings coupled to power circuitry. Each of the power modules are configured to power one OLED panel. Each of the OLED panels respectively includes secondary transformer windings coupled to OLEDs. When an OLED panel is connected to one of the power modules (e.g., via a suitable mechanical attachment mechanism), the primary winding of the power module couples with the secondary winding of the OLED panel to effectuate electromagnetic energy transfer from the power module to the OLED lighting panel.

The power transfer device of the system uses a daisy-chained transformer (DCT) structure to balance the current received from a switching network and supplied to each OLED lighting panel. In an aspect, the switching network employs a one series resonant converter with a half-bridge switching network to drive the system. The output current of each transformer in the DCT structure is respectively coupled to respective ones of the power modules and transferred to the respective OLED panels attached thereto.

In an aspect, the respective OLED panels can include an open load protection circuit and each of the power modules can include a freewheeling circuit. These circuits facilitate maintaining the current through a coupling transformer under abnormal or faulty conditions, including when an OLED panel is not connected to one of the power modules or is not properly aligned with a power module and when the OLED panel is properly aligned but the load is in open or short circuit conditions.

Unlike previous techniques which require multiple drivers to regulate and synchronize the driving current for each OLED panel used in a large-area illumination arrangement, the subject power transfer system requires only one switching network to drive multiple OLED lighting panels. As a result, the disclosed system can easily be extended to illuminate large areas with multiple OLED panels. In addition, the subject power transfer system provides high current balancing capability because the current through each OLED panel is balanced through the DCT structure. The system further provides robust current stabilization because the OLED driving current is stabilized and is not affected by the operation (normal or abnormal) of other panels. In addition, the system is modular and scalable as the number of OLED lighting panels can be added or removed flexibly. Furthermore, the system is hot swappable because an OLED light panel can be added or removed without affecting the operation of other lighting panels.

In an aspect, an inductive power transfer system for driving multiple organic light emitting diode panels is provided. The system includes a plurality of transformers electrically coupled to one another in a daisy-chain formation and a plurality of power modules operatively coupled to respective ones of the plurality of transformers. Respective output voltages of the plurality of transformers are configured to provide power to organic light emitting diode panels in response to respective ones of the organic light emitting diode panels being coupled to respective ones of the plurality of the power modules via respective detachable transformers mechanically and operatively coupled to the respective ones of the organic light emitting diode panels. The system further includes a single switching module operatively coupled to the plurality of transformers and configured to drive the inductive power transfer system with a single output current.

In another aspect, a device is provided that includes a housing and a power transfer circuit provided within the housing. The power transfer circuit includes power modules electrically coupled to one another in series via transformers respectively associated with the power modules, wherein the transformers are configured to distribute an input current between the respective power modules. The power transfer circuit further includes primary windings operatively coupled to respective power modules of the power modules, wherein the input current distributed between the respective power modules is configured to power organic light emitting diode panels via electromagnetic induction when respective panels of the organic light emitting diode panels are electrically coupled to respective primary windings of the primary windings via respective secondary windings included in the respective panels. The power transfer circuit also includes a switch operatively connected to the transformers and configured to control provision of the input current in response to being connected to a power source.

In another aspect, a device is disclosed that includes a housing, a light emitting diode attached to or positioned near the housing, and a power circuit provided within the housing and configured to provide power to the light emitting diode when electrically coupled to a power transfer device via electromagnetic induction. The power circuit includes a secondary coil configured to receive a magnetic flux and generate an output voltage to power the light emitting diode in response to connection to a primary coil of the power transfer device, wherein the primary coil of the power transfer device is operatively coupled to a power module, and wherein a current supplied to the power module is shared with at least one other power module electrically connected to the power module via a transformer. The device further includes a connection part configured to facilitate mechanical attachment of the device to the power transfer device and to facilitate alignment of the secondary coil relative to the primary coil.

In yet another aspect, a method is disclosed that includes receiving by a transformer of a plurality of transformers electrically coupled to one another in a daisy-chain formation, a current from a single input source and distributing the current to a plurality of power modules via respective transformers of the plurality of transformers. The method further includes transferring distributed portions of the current to organic light emitting diode panels in response to respective ones of the organic light emitting diode panels being coupled to respective ones of the power modules via respective detachable transformers mechanically and operatively coupled to the respective ones of the organic light emitting diode panels.

Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

Referring now to the drawings, with reference initially to FIG. 1, presented is a diagram of an example inductive power transfer system 100 for driving multiple OLED panels using a single switch in accordance with various aspects and embodiments described herein. Each panel is driven by an output of a daisy-chained transformer (DCT) structure through a detachable transformer, where the DCT structure is driven by a switching network. Apart from easy and safe operation, the system offers users with a modular, scalable, low-maintenance, and hot-swappable platform for large-area illumination.

Inductive power transfer system 100 includes a power transfer device 102 and one or more detachable OLED lighting units $126_1$-$126_N$ (where N is an integer) respectively including OLED panels $130_1$-$130_N$. The OLED lighting panels $130_1$-$130_N$ respectively include one or more OLEDs. However it should be appreciated that other suitable electric lighting devices can employed in the respective lighting panels. The power transfer device 102 is configured to provide power to respective ones of the OLED lighting units $126_1$-$126_N$ when the respective ones of the OLED lighting units are operatively and electrically coupled thereto. Although four OLED lighting units $126_1$-$126_N$ are depicted, power transfer device 102 can be adapted to provide power to any number N of OLED s lighting units $126_1$-$126_N$.

Power transfer device 102 includes power circuit 104. Power circuit 104 includes a switching unit 106 (also referred to herein as a switch and a switching network), a DCT transformer structure 108 and a plurality of power modules $112_1$-$112_N$. Each of the power modules $112_1$-$112_N$ are configured to provide power for a single OLED lighting unit 126. Accordingly, the number of power modules $112_1$-$112_N$ included in power transfer device 102 can be adapted to provide power for any desired number of OLED lighting units $126_1$-$126_N$. Switching unit 106 is configured to drive the entire power system 100. In particular, switching unit 106 is configured to control provision of an input current/voltage (e.g., an alternating current (AC)) to the DCT transformer structure 108 for powering the power transfer device 102. The input current can be received at switching unit 106 from a power source (e.g., an external power source or an internal power source, such as a battery) electrically coupled to power transfer device 102. In an aspect, switching unit 106 can include a series resonant converter with a half-bridge.

DCT transformer structure 108 includes a plurality of transformers (TF) $110_1$-$110_N$ operatively and electrically coupled to one another in a sequence or in a ring. The DCT transformer structure 108 is configured to receive an input current provided by the switching unit 106 and circulate the input current evenly or substantially evenly through the respective transformers $110_1$-$110_N$. Accordingly, each of the transformers TF $110_1$-$110_N$ is configured to share a single or same input current. In electrical and electronic engineering a daisy chain refers to a wiring scheme in which multiple devices are wired together in sequence or in a ring. In order to form a daisy chain using transformers the primary and secondary windings of each transformer are connected to two different power modules, so that the currents through the two power modules are mutually coupled. In an aspect, each transformer TF 110 of the daisy chain structure is associated with a single power module 112. For example, TF $110_1$ is associated with power module $112_1$, TF $110_2$ is associated with power module $112_2$, etc. Each TF 110 is configured to distribute a portion of the input current to the respective power module it is associated with. In an aspect, the output voltages of the respect transformers $110_1$-$110_N$ are the same or substantially the same.

Each power module $112_1$-N includes a circuit $114_1$-N, respectively. Circuits $114_1$-N respectively include a microprocessing units MCU $116_1$-N, respectively, freewheeling circuits $118_1$-N, respectively, and primary transformer inductors $120_1$-N, respectively. However, in some embodiments, the number of MCUs can be different from the number of power modules 112. For example, a plurality of power modules 112 (e.g., two, three, four, etc.) can share a single a single MCU 116 (e.g., based on the amount of I/O of the MCU). In an aspect, the primary transformer inductor 120 is formed with an EE type ferrite core and a printed circuit board (PCB) coil or metal winding. For each power module 112, the freewheeling circuit 114 is configured to reduce voltage spikes, facilitate lighting efficiency, and facilitate equal or substantially equal luminance between respective ones of the OLED lighting units 126 that are properly attached/aligned to their respective power modules when an OLED lighting unit associated with the power module is not attached thereto and/or is attached thereto but improperly aligned. In other words, when an OLED lighting unit is disconnected from its power module, the freewheeling circuit for its power module ensures that the other OLED lighting units that are respectively attached to their power modules have the same or substantially the same luminescence. In particular, all the OLEDs lighting units 126 can be turned on when they are well aligned to the power transfer device 102. The respective freewheeling circuits 114 are used to bypass their associated OLED lighting units 126 when their OLED lighting units are not well aligned to the power transfer device 102. Thus, a freewheeling circuit 114 for an OLED lighting unit that is not properly aligned to the power transfer device 102 can ensure even luminance at each of the other OLED lighting units that are properly aligned to the power transfer device 102.

For example, for each power module $112_1$-N, the MCU 116 is configured to detect when the OLED lighting unit 126 is not attached thereto and/or is improperly aligned therewith and turn on the freewheeling circuit 116. Similarly, the MCU 116 is configured to detect when the OLED lighting unit is attached and properly aligned with its power module and turn off the freewheeling circuit. Each OLED lighting unit $126_1$-N also includes a circuit $124_1$-N respectively coupled to an OLED lighting panel $130_1$-N. Circuits $124_1$-N respectively include secondary transformer inductors $122_1$-N, respectively and open load protection circuits $128_1$-N. In an aspect, the second transformer inductor 122 is formed with an EE type ferrite core and a printed circuit board (PCB) coil or metal winding. For each OLED lighting unit $126_1$-N, the open load protection circuit 128 is configured to establish a short circuit condition within the circuit 124 when the load becomes open circuit (e.g., under faulty conditions of the circuit 124).

Figure 2:
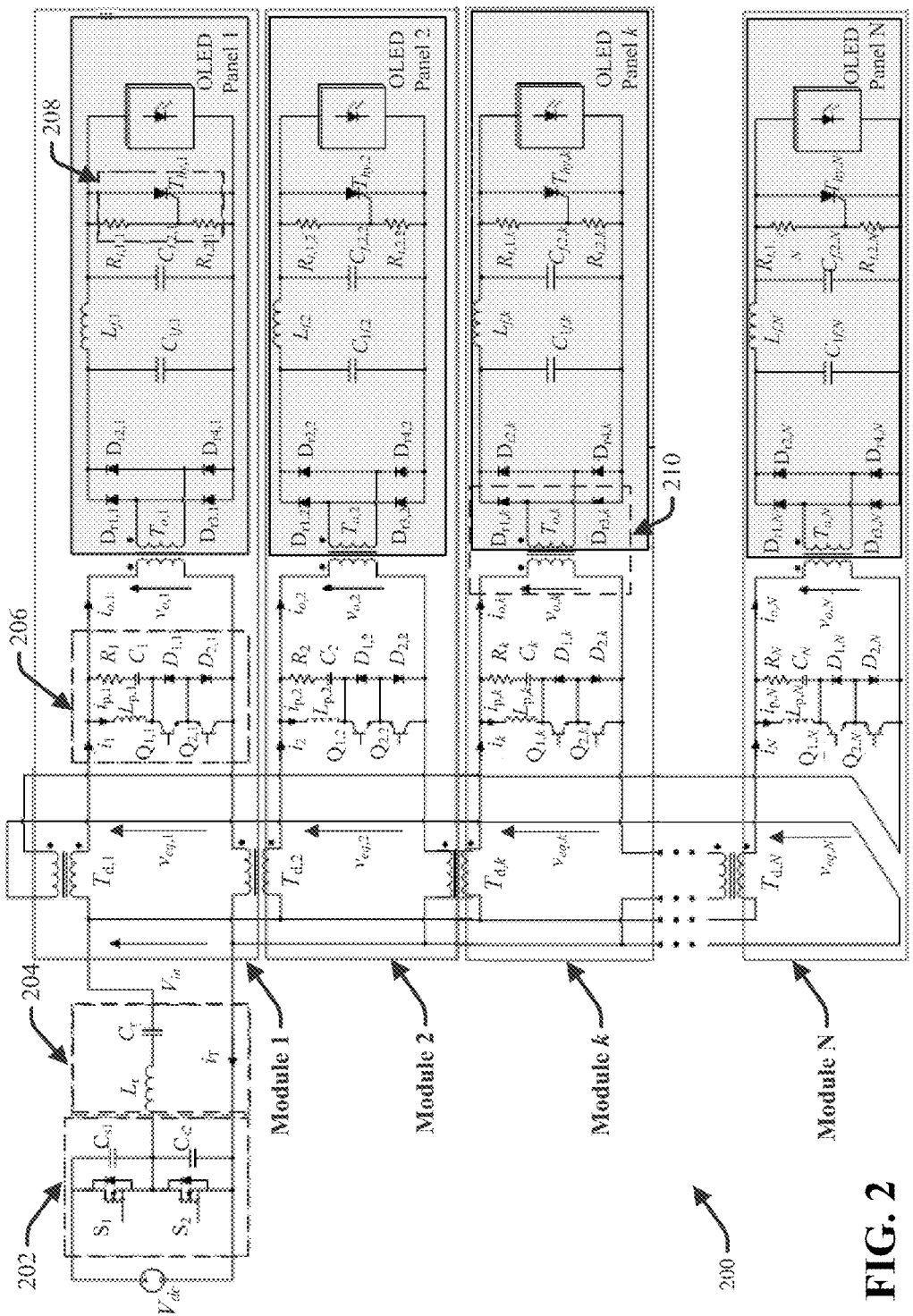
FIG. 2 presents a circuit schematic of an example system for driving multiple OLED panels using a single switch in accordance with various aspects and embodiments described herein.

FIG. 2 presents a circuit schematic 200 of an example system for driving multiple OLED panels (e.g., OLED panels$_{1-N}$) using a single switch network in accordance with various aspects and embodiments described herein. In an aspect, system 100 can employ circuit schematic 200. Repetitive description of like elements employed in respective embodiments of devices and systems described herein is omitted for sake of brevity.

Circuit schematic 200 includes circuitry for both the power transfer device (e.g., power transfer device 102) and the detachable OLED panel units (e.g., OLED panel units ($126_1$-$126_N$) of the disclosed power transfer system 100. The circuitry included in the detachable OLED panel units is highlighted in grey. The portion of the circuit schematic 200 excluded from the detachable OLED panel units corresponds to the circuitry included in the power transfer device (e.g., power transfer device 102). Circuit schematic 200 depicts OLED panels units (e.g., OLED panel units 1-N) being connected to their respective power modules (e.g., power modules 1-N). However it should be appreciated that one or more of the OLED panel units can be detached from their respective power modules.

Circuit schematic 200 presents circuitry for a power transfer system with N power modules, modules 1-N (where N is an integer). Module k corresponds to the module immediately preceding the $N^{th}$ module (e.g., the second to last module). The circuitry of the power transfer device consists of one switching network 202 formed by the semiconductor switches $S_1$ and $S_2$. The input of each power module 1-N is common and its voltage is $v_{in}$. The output of the switching network 202 is used to drive the N modules through an inductor $L_r$ and capacitor $C_r$ which form a resonant tank 204. In an aspect, the duty cycles of $S_1$ and $S_2$ are slightly less than 50%. The capacitor $C_r$ is used to block the dc component. $C_{s1}$ and $C_{s2}$ create zero-voltage switching (ZVS) conditions for $S_1$ and $S_2$. The switching frequency of $S_1$ and $S_2$, determines the OLED panel power (e.g., lamp power). In an aspect, the switching frequency of $S_1$ and $S_2$, is higher than the natural frequency of the overall resonant tank 204 so as to ensure ZVS of $S_1$ and $S_2$. Each power module 1-N is used to drive an OLED lighting panel through a detachable transformer $T_{o,1-N}$. The detachable transformer $T_{o,k}$ is called out for module k by box 210. Transformer $T_{o,k}$ and the like is referred to herein as a detachable transformer because the secondary winding or coil of the transformer is provided in the detachable OLED lighting unit (e.g., the portions in grey) while the primary winding is provided in the power module of power transfer device.

The OLED driving current $v_{in}$ is rectified by a diode bridge and a low-pass filter. In an aspect, a capacitor input filter (e.g., a PI-filter) is used to reach a better performance and smaller volume. The current through each power module 1-N is coupled to the next module through a transformer $T_{d,1-N}$ (e.g., $T_{d,k}$ between the k-th and (k−1)-th modules). The connections among $T_{d,1}$, $T_{d,2}$, . . . , and $T_{d,N}$ form a daisy chain for balancing the current supplied to each module. The current through each OLED panel 1-N is regulated by regulating the output current of the switching network $i_T$. Thus, the proposed system does not require multiple switching networks. Moreover, the system is modular and scalable (e.g., any number of power modules can be added or removed)

Since the power module current $i_{1-N}$ is regulated, short circuit of the loads does not affect the performance of the whole structure 200. However, when a load for a particular power module is open circuit (e.g., when the circuit of the detachable OLED lighting unit connected to the power module is faulty), the current fort the particular power modules drops to zero. Because of the DCT structure, the currents then supplied to the other modules will be will be affected such that the current-sharing function of the whole structure cannot be maintained. In order to prevent this scenario, each of the OLED lighting unit circuits includes open load protection circuits (e.g., open load protection circuits $128_1$-$128_N$). The open load protection circuit is configured to transfer the load open-circuit condition of an OLED lighting unit into a load short circuit condition.

Call out box 208 identifies the open load protection circuit for the detachable OLED lighting unit attached to power module 1. The open load protection circuits of the other OLED lighting units are the same as that identified for module 1. With reference to the open load protection circuit of the OLED lighting unit attached to power module k, the open load protection circuit is formed by two large value resistances $R_{t1,k}$, $R_{t2,k}$ and a thyristor $T_{hy,k}$. The gate of $T_{hy,k}$ is in common to $R_{t1,k}$ and $R_{t2,k}$. Under the normal working condition, the voltage across $R_{t2,k}$ is lower than the threshold voltage of $T_{hy,k}$, so the open load protection circuit stays off. However, when the OLED lighting unit is open circuit, the voltage across the OLED increases. The open load protection circuit is configured to detect this rapid increase in voltage (e.g., with respect to a voltage increase threshold that can include a rate increase component and a voltage amount component) and trigger $T_{hy,k}$. Therefore, the open circuit load is bypassed.

Figure 3:
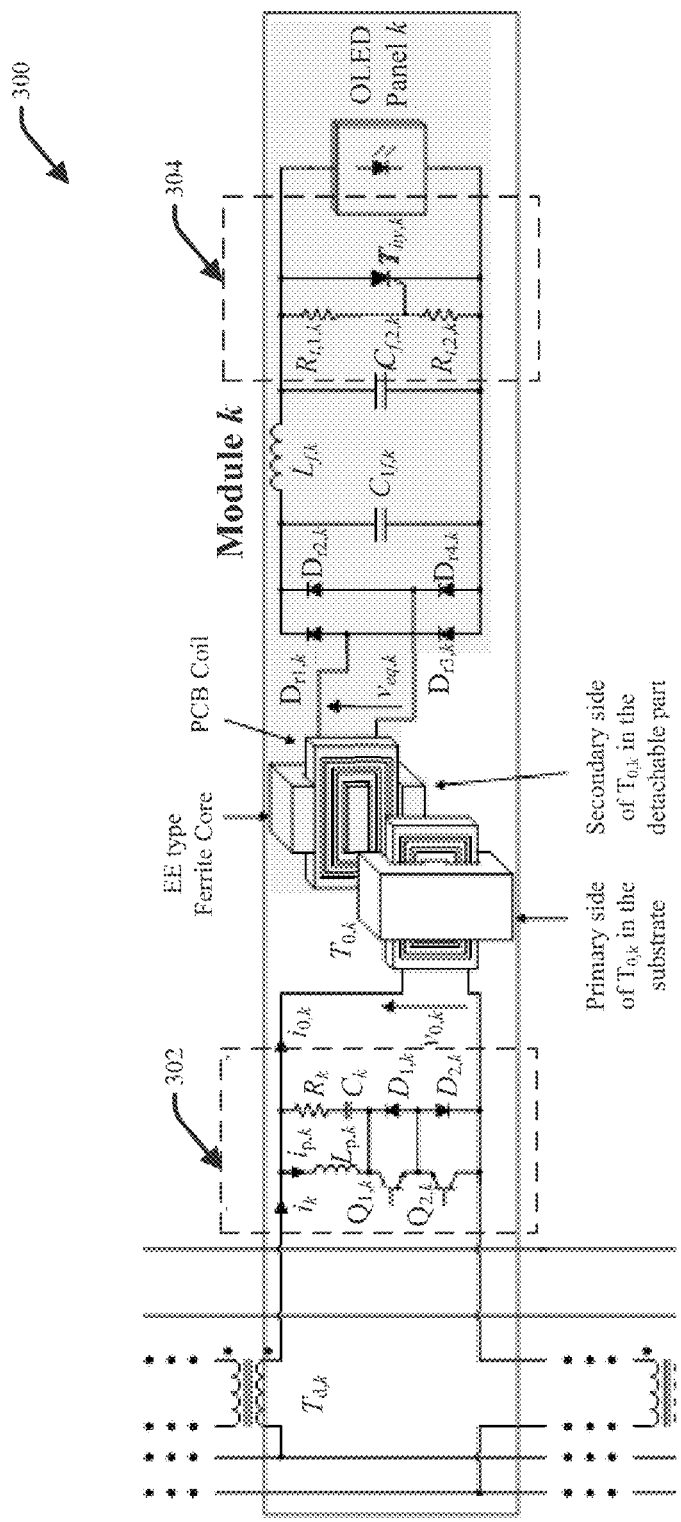
FIG. 3 presents an enlarged view of the circuit schematic of a single power module an associated OLED lighting unit in accordance with various aspects and embodiments described herein.

FIG. 3 presents an enlarged view of the circuitry 300 associated with a power module of circuit schematic 200 in accordance with various aspects and embodiments described herein. Although power module k is exemplified, it should be appreciated that the respective power modules 1-N include the same circuitry. Repetitive description of like elements employed in respective embodiments of devices and systems described herein is omitted for sake of brevity.

As seen in FIG. 3, the detachable transformer $T_{o,k}$ consists of an EE type ferrite core and a PCB coil for a primary side and a secondary side. The secondary side of $T_{o,k}$ is connected/attached to the detachable OLED unit (highlighted in grey), and the primary side of $T_{o,k}$ is connected/attached to module k of the power transfer device (e.g., the substrate). When the secondary side and the primary side of $T_{o,k}$ are brought together in proper alignment, energy is transferred from the primary side to the secondary side to generate a voltage $v_{eqk}$, in the detachable OLED unit for powering the OLED panel k.

Figure 4:
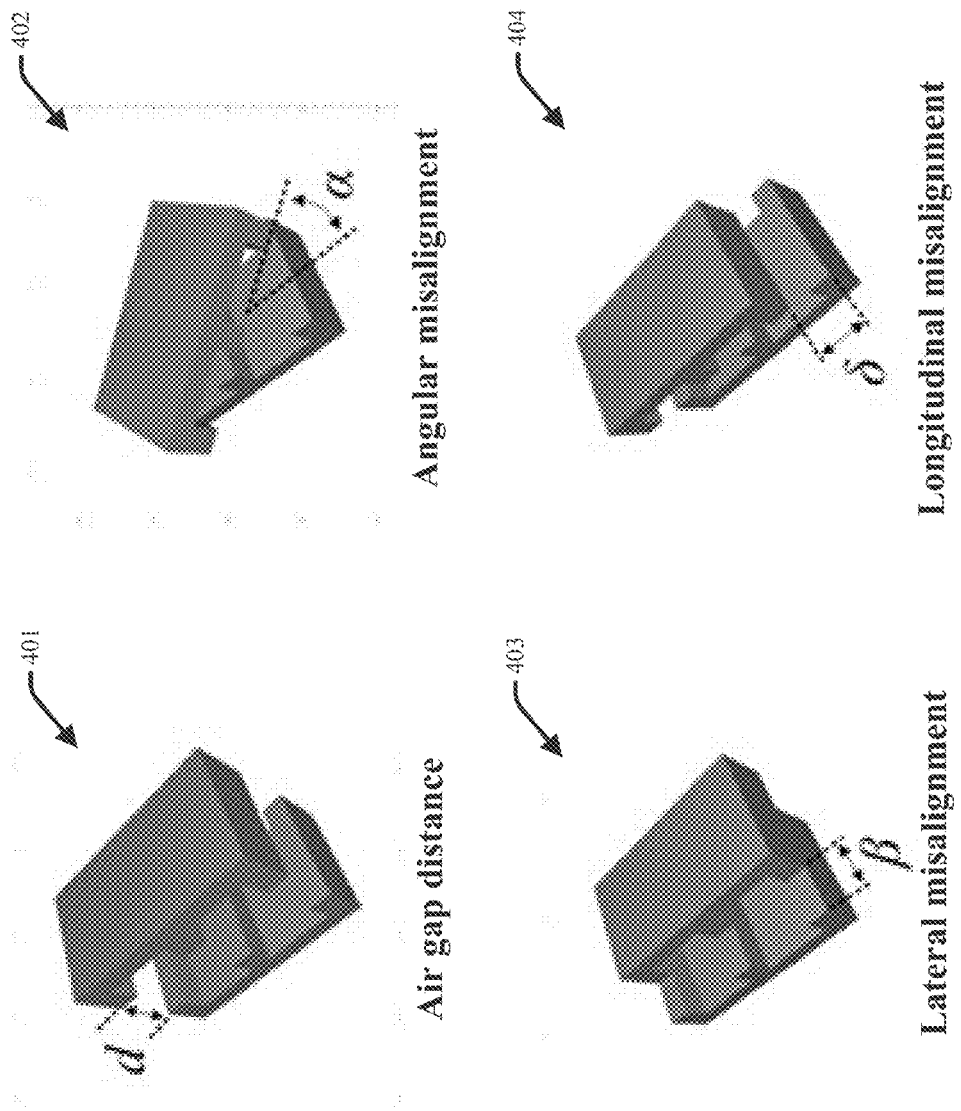
FIG. 4 depicts various example mechanisms via which the primary and secondary sides of a detachable transformer can misalign, in accordance with various aspects and embodiments described herein.

In an aspect, when there is an air gap in the detachable transformer (e.g., when the primary and secondary sides of $T_{o,k}$ are not well aligned), the magnetic coupling efficiency of the transformer drops significantly. FIG. 4 depicts various example mechanisms via which the primary and secondary sides of the detachable transformer can misalign, resulting in an air gap. Image 401 demonstrates an air gap when the primary and secondary sides are pulled apart wherein d corresponds to the air gap distance. In an aspect, proper alignment is effectuated when the primary and secondary sides match up in the configuration depicted in image 401 and when d is less than 0.1 mm. Image 402 demonstrates an air gap resulting from angular misalignment, wherein a corresponds to a measure of angular misalignment. Image 403 demonstrates an air gap resulting from lateral misalignment wherein β represents a measure of lateral misalignment. Image 404 demonstrates an air gap resulting from longitudinal misalignment wherein δ corresponds to a measure of longitudinal misalignment.

When there is an air gap in the detachable transformer the reactive power circulating in the primary side of detachable transformer increases and the luminance of the OLED panel cannot be ensured. In order to ensure all the modules have optimal lighting efficiency, a freewheeling circuit (e.g., identified by call out box 302 in FIG. 3) is coupled to the primary side circuitry (e.g., the primary winding or primary coil of $T_{o,k}$) included in the power module of the power transfer device. The freewheeling circuit essentially facilitates bypassing energy transfer to the secondary side of the detachable transformer when it is not well aligned with the primary side.

Figure 5:
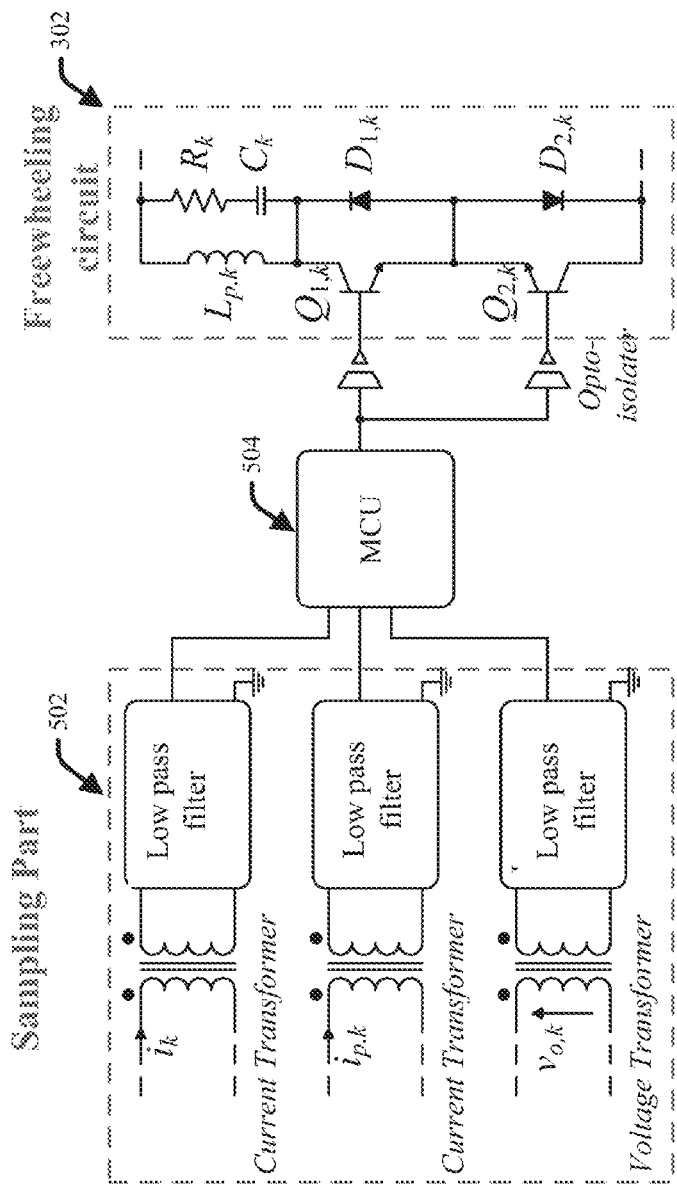
FIG. 5 presents an enlarged view of a freewheeling circuit and its associated control circuitry in accordance with various aspects and embodiments described herein.

FIG. 5 presents an enlarged view of freewheeling circuit 302 and its associated control circuitry in accordance with various aspects and embodiments described herein. It should be appreciated that the freewheeling circuit of power module k is described merely for exemplary purposes and the freewheeling circuits included in the other power modules (e.g., freewheeling circuits $118_1$-$118_N$ and the like) are the same as freewheeling circuit 302. Freewheeling circuit 302 is operatively connected to an MCU 504 to control operation of the freewheeling circuit 302. It should be appreciated that MCU 504 can correspond to MCUs $116_1$-$116_N$ and the like. Repetitive description of like elements employed in respective embodiments of devices and systems described herein is omitted for sake of brevity.

Freewheeling circuit 302 is formed by two small BTJs $Q_{1,k}$ and $Q_{2,k}$, two diodes, and a parallel circuit including a resistor $R_k$, an inductor $L_{p,k}$, and a capacitor $C_k$ (e.g., an RLC circuit). $R_k$ and $C_k$ are used to absorb the energy stored in $L_{p,k}$ when BJTs are turned off suddenly. The triggering circuitry components of a power module that are associated with the freewheeling circuit (e.g., power module k) are identified in FIG. 5 as the sampling part 502. Triggering on and off of the freewheeling circuit 302 is based on the primary-side voltage of the detachable transformer $v_{o,k}$, the power module current $i_k$, and the freewheeling circuit current $i_{p,k}$. MCU 504 is configured to monitor and sense the primary-side voltage of the detachable transformer $v_{o,k}$, the power module current $i_k$, and the freewheeling circuit current $i_{p,k}$. In an aspect, $i_{o,k}$ is obtained indirectly by subtracting $i_{p,k}$ from $i_k$ in order to cancel the errors generated by low pass filters. In an aspect, MCU 504 is configured to control the on/off states of BJTs $Q_{1,k}$ and $Q_{2,k}$, according to the sensed voltage and currents and thresholds for the sensed voltage and currents.

In an aspect two thresholds $\Delta i_{ref}$ and $v_{ref1}$ are used. According to this aspect, when $i_{o,k}/i_k$, $>\Delta i_{ref}$ and $v_{o,k}<v_{ref1}$, the MCU is configured to turn the freewheeling circuit 506 (e.g., BJTs $Q_{1,k}$ and $Q_{2,k}$) on. In addition, when $i_{o,k}/i_k$, $>\Delta i_{ref}$ and $v_{o,k}>v_{ref1}$, or when $i_{o,k}/i_k$, $<\Delta i_{ref}$ and $v_{o,k}<v_{ref1}$, the MCU is configured to turn the freewheeling circuit off.

The magnetizing inductance $L_{om,k}$ of the detachable transformer $T_{o,k}$ is directly related to the alignment of the primary side and the secondary side of the detachable transformer $T_{o,k}$. In particular, $L_{om,k}$ decreases as the air gap distance d increases. Similarly, $L_{om,k}$ decreases based on the degree of angular, lateral, and longitudinal misalignment. Thus in an aspect, the detachable transformer $T_{o,k}$ is configured with a degree of misalignment tolerance. That is the required magnetizing inductance $L_{om,k}$ of the detachable transformer $T_{o,k}$ for powering operation of the OLED panel can be selected to account for various degrees of air gap distance, angular misalignment, lateral misalignment, and longitudinal misalignment. Similarly, MCU 504 can be configured to turn the freewheeling circuit 302 on and off based on a threshold requirement for $L_{om,k}$. For example, when $L_{om,k}$ is less than or equal to 100 μH, the MCU 504 can be configured to turn on the freewheeling circuit 302. Similarly, when $L_{om,k}$ is greater than 100 μH, the MCU can be configured to turn off the freewheeling circuit 302.

In an aspect, MCU 504 is configured to turn the freewheeling circuit on when d is greater than a threshold value, and off when d is less than the threshold value. For example, When d increases from 0 mm to 0.1 mm, the magnetizing inductance $L_{om,k}$ of the detachable transformer $T_{o,k}$ decreases significantly from 800 μH to 100 μH. Smaller values of $L_{om,k}$ causes more reactive power circulating in the primary side of $T_{o,k}$, which results in decreased lighting efficiency. In an aspect, in order to maintain the lighting efficiency at an optimal level, MCU 504 is configured to turn and keep $Q_{1,k}$ and $Q_{2,k}$ of the freewheeling circuit on until d is smaller than 0.1 mm. In other words, the MCU 504 can be configured to turn the freewheeling circuit 302 on when d is greater than or equal to 0.1 mm and off when d is less than 0.1 mm.

As previously noted, the open load protection circuits provided in the respective detachable OLED panel units and the freewheeling circuits provided in the respective power modules of the subject power transfer system (e.g., systems 100, 200 and the like) facilitate maintaining the current through the detachable transformer (e.g., $T_{o,k}$) under abnormal or faulty conditions. In an aspect, there are three stable states associated with the subject power transfer system including: 1) the detachable part is well aligned and in normal working condition, 2) no detachable part connected or the detachable part is not well aligned, and 3) the detachable part is well aligned but the load is in open or short circuit conditions.

Looking back to FIG. 3, analysis of these three states is described with reference to power module k. In FIG. 3, the freewheeling circuit of power module k is identified by 302 and the open load protection circuit of the detachable OLED unit associated with power module k is identified by 304. The detachable OLED unit is highlighted in grey.

Under state 1), the detachable OLED unit is well aligned and the OLED panel unit is in normal working condition. When the OLED is working normally, the voltage $v_{eq,k}$ on the primary side of $T_{o,k}$ is a square wave which is in phase with the current $i_k$. Its amplitude is equal to $v_{OLED,k}$. For the sake of simplicity in analysis, the magnetizing inductance of $T_{o,k}$ is neglected, Because the equivalent impedance of the working (WED is much smaller than the impedance of $T_{o,k}$ under well a aligned condition, the state of the power module k is characterized by equations 1 and 2, wherein $i_k = a_k + jb_k$ and $v_{eq,k} = c_k + jd_k$.

$$c_k = \frac{a_k}{\sqrt{a_k^2 + b_k^2}} \frac{4v_{OLED,k}}{\pi} \quad \text{(Eq. 1)}$$

$$d_k = \frac{b_k}{\sqrt{a_k^2 + b_k^2}} \frac{4v_{OLED,k}}{\pi} \quad \text{(Eq. 2)}$$

Under state 2), the detachable OLED unit is not connected to the power module of the power transfer device or the detachable OLED unit is not well aligned. In this scenario, the freewheeling circuit 302 is triggered and $Q_{1,k}$ and $Q_{2,k}$ are turned on. When $Q_{1,k}$ and $Q_{2,k}$ is on, the power module current flows mainly through the freewheeling circuit and the voltage $v_{eq,k}$ becomes lower than the threshold voltage of the OLED lighting unit. As a result, the OLED lighting unit circuit is equal to an open circuit and the transformer $T_{o,k}$ can be considered as an inductor with inductance $L_{om,k}$. Thus, the voltage $v_{eq,k}$ across the primary side of transformer $T_{o,k}$ is characterized by equations 3-5 below.

$$v_{eq,k} = i_k(L_{p,k} // L_{om,k}) = -\omega_s b_k \frac{L_{p,k} L_{om,k}}{L_{p,k} + L_{om,k}} + j\omega_s a_k \frac{L_{p,k} L_{om,k}}{L_{p,k} + L_{om,k}} \quad \text{(Eq. 3)}$$

$$c_k = -\omega_s b_k \frac{L_{p,k} L_{om,k}}{L_{p,k} + L_{om,k}} \quad \text{(Eq. 4)}$$

$$d_k = \omega_s a_k \frac{L_{p,k} L_{om,k}}{L_{p,k} + L_{om,k}} \quad \text{(Eq. 5)}$$

Under state 2), the detachable OLED unit is well aligned but the load is open or short circuit. When the load is open circuit, the open load protection circuit 304 turns the condition into a short circuit condition. Neglecting the little voltage drops on $T_{hy,k}$, in the short circuit condition $v_{eq,k}$ is equal to zero. Accordingly, the state of the power nodule k becomes:

$$c_k = 0 \quad \text{(Eq. 6)}$$

$$d_k = 0 \quad \text{(Eq. 7)}$$

In view of the above scenarios, the state of the collective power transfer at under any condition can be characterized by equations 8-11 below.

$$[N_1 Z_{dm}(j\omega_s) N_2 + Z_{IL}(j\omega_s) + X] \begin{bmatrix} a_1 + jb_1 \\ a_2 + jb_2 \\ \vdots \\ a_{N-1} + jb_{N-1} \\ a_N + jb_N \end{bmatrix} = \psi \begin{bmatrix} \frac{2V_{dc}}{\pi} + \omega_s L_r(b_1 + b_2 + \ldots + b_N) \\ -j\omega_s L_r(a_1 + a_2 + \ldots + a_N) \end{bmatrix} \quad \text{(Eq. 8)}$$

where $$X = \begin{bmatrix} \chi_1 & 0 & 0 & 0 & \ldots & 0 & 0 \\ 0 & \chi_2 & 0 & 0 & \ldots & 0 & \vdots \\ 0 & 0 & \chi_3 & 0 & \ddots & \vdots & 0 \\ 0 & 0 & 0 & \ddots & \ddots & 0 & 0 \\ \vdots & \vdots & \ddots & \ddots & \chi_{N-2} & 0 & 0 \\ 0 & 0 & \ldots & 0 & 0 & \chi_{N-1} & 0 \\ 0 & 0 & \ldots & 0 & 0 & 0 & \chi_N \end{bmatrix}$$

When power module k is in state 1), $$\chi_k = \frac{4v_{OLED,k}}{\pi \sqrt{a_k^2 + b_k^2}} \quad \text{(Eq. 9)}$$

When power module k is in state 2), $$\chi_k = j\omega_s b_k \frac{L_{p,k} L_{om,k}}{L_{p,k} + L_{om,k}} \quad \text{(Eq. 10)}$$

When power module k is in state 3), $$\chi_k = 0 \quad \text{(Eq. 11)}$$

In an aspect, $a_k$ and $b_k$ can be obtained by equaling the real and imaginary parts of the LHS and RHS of equation 8, When module k is under state 1) S1, the average value of $i_k$ equals to the OLED current $i_{OLED,k}$, as characterized by equation 12, $$i_{OLED,k} = \frac{1}{\pi} \int_0^\pi i_k d\omega_s t = \frac{2}{\pi} |i_k| = \frac{2}{\pi} \sqrt{a_k^2 + b_k^2} \quad \text{(Eq. 12)}$$

Figure 6:
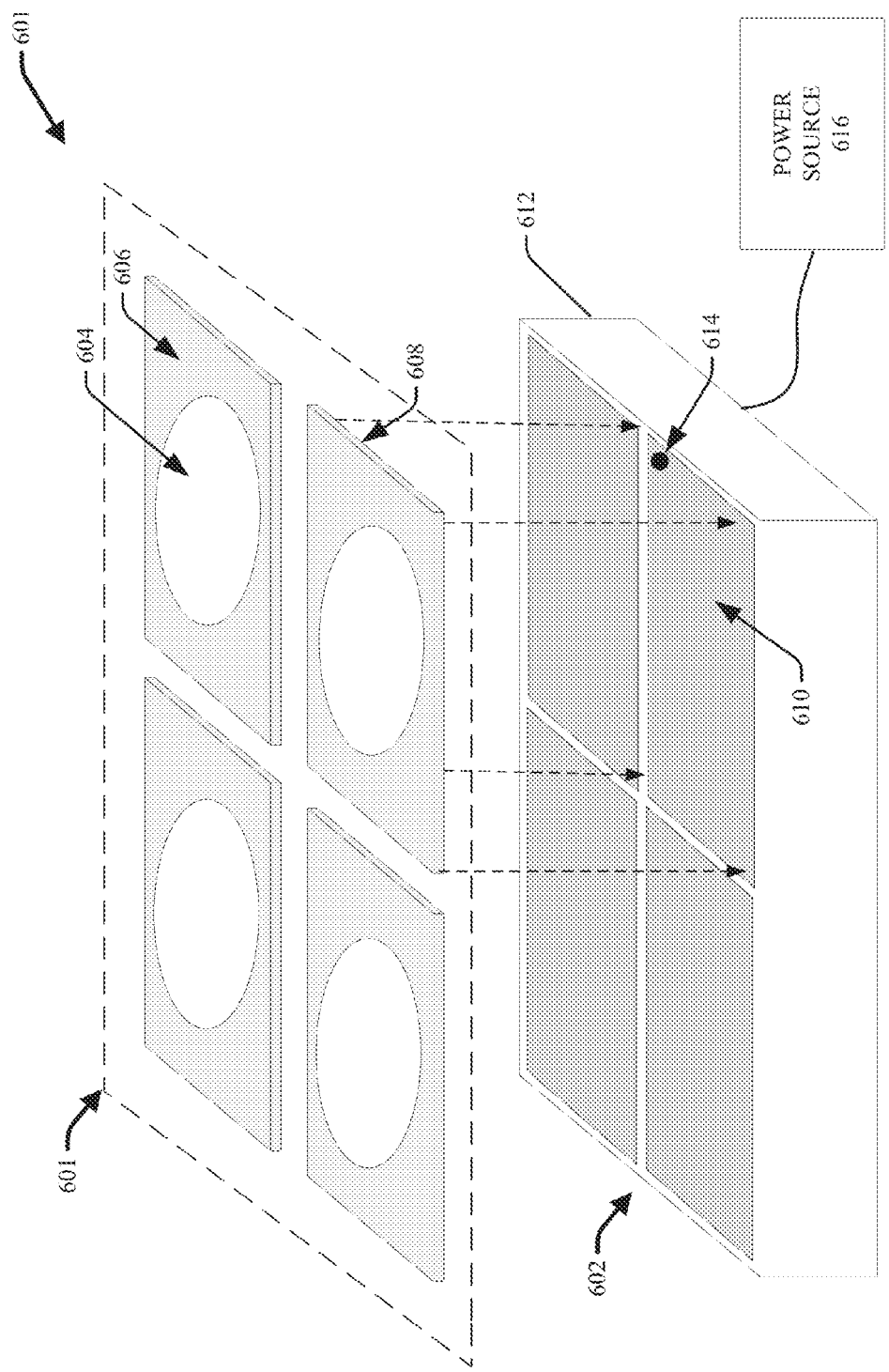
FIG. 6 presents example structural components of an inductive power transfer system for powering multiple OLED lighting panels in accordance with various aspects and embodiments described herein.

FIG. 6 presents example structural components of an inductive power transfer system 600 for powering multiple OLED lighting panels in accordance with various aspects and embodiments described herein. Repetitive description of like elements employed in respective embodiments of devices and systems described herein is omitted for sake of brevity.

As previously described, the disclosed inductive power transfer system includes a power transfer device (e.g., power transfer device 102) and a plurality of OLED lighting units (e.g., OLED lighting units $130_1$-$130_N$). As presented in FIG. 6, device 602 corresponds to the power transfer device and the plurality of OLED lighting units are identified in box 601. In an aspect, the power transfer device 602 includes a housing 612 and the power circuit (e.g., power circuit 104) associated with the power transfer device 602 is provided within the housing. The housing 612 can include an internal power source (e.g., a battery) to provide power for powering the power circuit therein, and/or include wiring for connecting the power circuit therein to an external power source 616. In an aspect, the housing 612 can include a plurality of attachment areas or slots 610 for receiving the OLED lighting units. For example, four OLED lighting units 601 are depicted for connecting to respective attachment areas or slots on the housing 612.

The respective OLED lighting units include a housing 606 with OLED lights or panels 604 provided thereon or therein. Power circuitry of the OLED lighting unit (e.g., circuits $1240_1$-$1240_N$) is provided within the housing 606. In an aspect, the OLED lighting units can include a first connection part 608 (e.g., provided on the bottom side of the OLED lighting unit, opposite of the top side including the OLED light/panel 604), and/or the attachment areas/slots 608 can include a second connection part 614 to facilitate mechanical attachment of the OLED lighting units to the respective attachment areas/slots 608 and to facilitate alignment of the secondary coil included in the OLED lighting unit circuitry relative to the primary coil included in the power transfer device circuitry. For example, the first and/or second connection parts 608 and 614 respectively can include magnets configured to magnetically couple with one another to facilitate mechanical attachment of the respective OLED lighting units to the respective attachment slots 608 and to facilitate alignment of the respective primary windings and the respective secondary windings. In an aspect, the magnets can be integrated onto or within the PCBs including the primary windings and/or the secondary windings of the power transfer device 602 and the OLED lighting units, respectively. When an OLED lighting unit is brought close to an attachment area/slot 608, the magnet will make the magnetic core on the OLED lighting unit align with the magnetic core on the driver. Thus, the coupling effect of the detachable transformer can be maximized.

Figure 7:
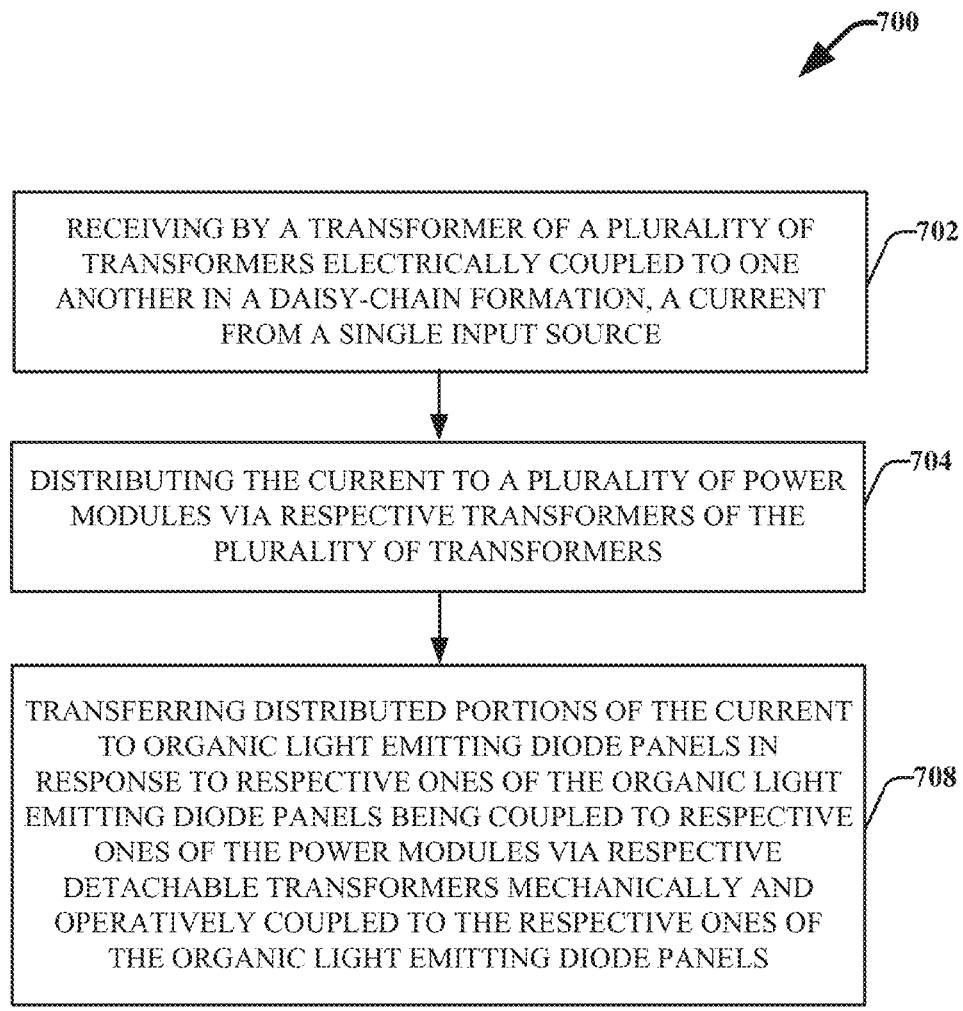
FIG. 7 is a flow diagram of an example method for driving multiple OLED panels using a single switch in accordance with various aspects and embodiments described herein.
Figure 8:
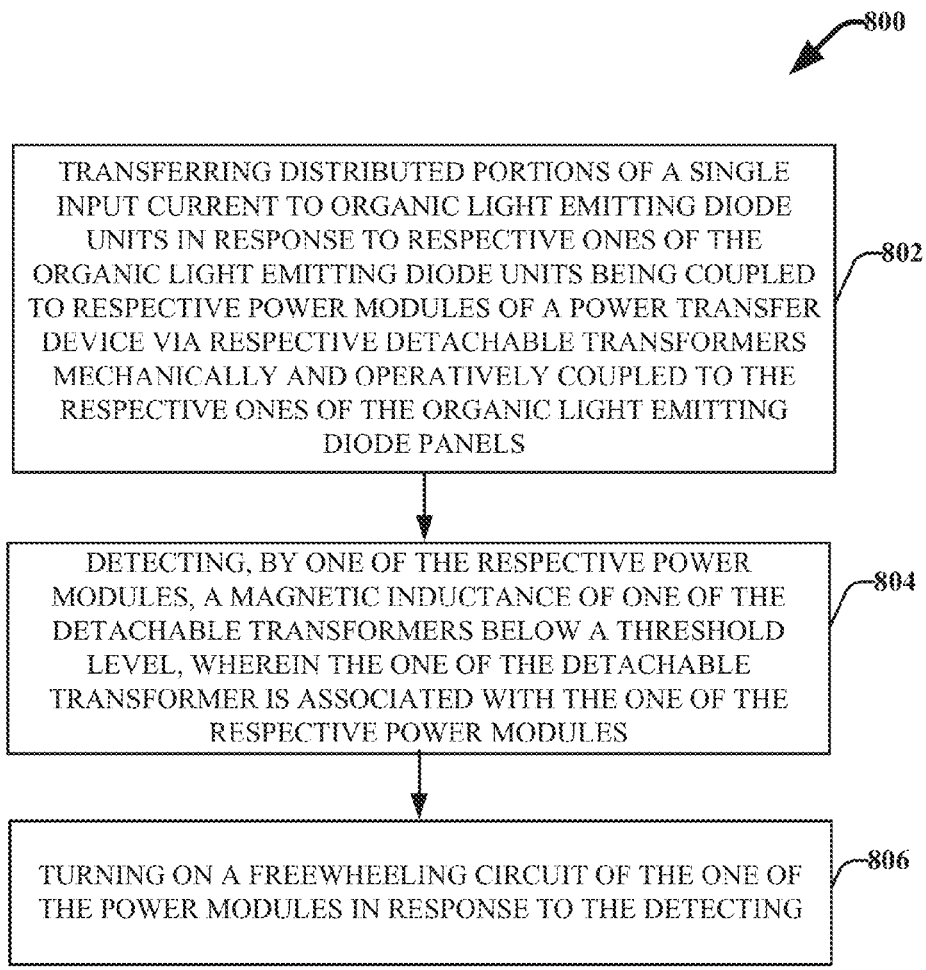
FIG. 8 is a flow diagram of another example method for driving multiple OLED panels using a single switch in accordance with various aspects and embodiments described herein.

In view of the example systems and/or devices described herein, example methods that can be implemented in accordance with the disclosed subject matter can be further appreciated with reference to flowcharts in FIGS. 6-8. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 for driving multiple OLED lighting panels in accordance with aspects described herein. At 702, a transformer of a plurality of transformers electrically coupled to one another in a daisy-chain formation receives a current from a single input source (e.g., switching unit 106). At 704, the current is distributed to a plurality of power modules (e.g., power modules $112_1$-$112_N$) via respective transformers of the plurality of transformers. At 706, distributed portions of the current are transported to organic light emitting diode panels in response to respective ones of the organic light emitting diode panels being coupled to respective ones of the power modules via respective detachable transformers mechanically and operatively coupled to the respective ones of the organic light emitting diode panels.

FIG. 8 illustrates a flow chart of an example method 800 for driving multiple organic OLED lighting panels in accordance with aspects described herein. At 802, distributed portions of a single input current are transferred to organic light emitting diode units in response to respective ones of the organic light emitting diode units being coupled to respective power modules of a power transfer device via respective detachable transformers mechanically and operatively coupled to the respective ones of the organic light emitting diode panels. At 804, one of the respective power modules detects a magnetic inductance of one of the detachable transformers below a threshold level, wherein the one of the detachable transformers is associated with the one of the respective power modules (e.g., the detachable transformer is connected to the power module but misaligned or the detachable transformer becomes disconnect from the power module). At 806, in response to detecting the magnetic inductance being below the threshold level, the one of the power modules turns on a freewheeling circuit associated therewith (e.g., and operatively coupled to the primary coil of the detachable transformer).

Figure 9:
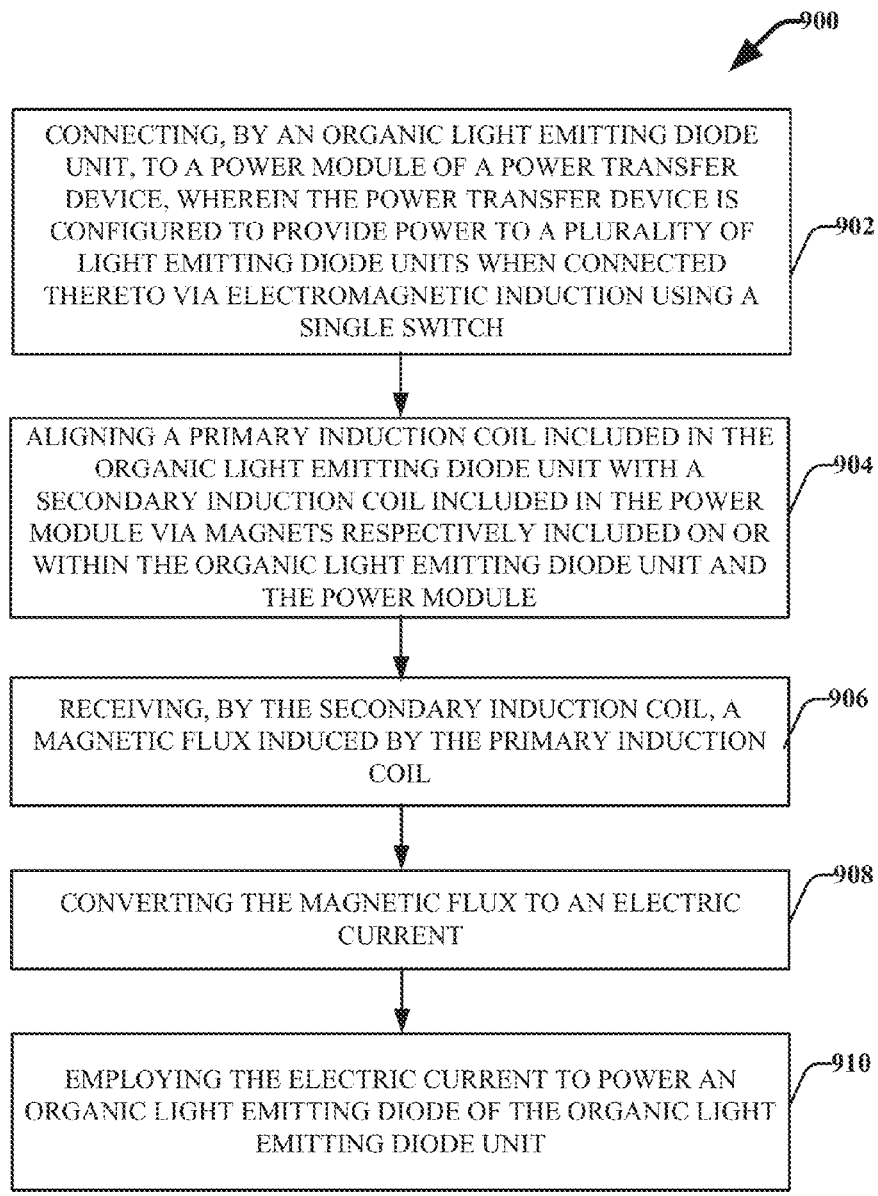
FIG. 9 is a flow diagram of another example method for driving multiple OLED panels using a single switch in accordance with various aspects and embodiments described herein.

FIG. 9 illustrates a flow chart of an example method 900 for driving multiple OLED lighting units in accordance with aspects described herein. At 902, an organic light emitting diode unit connects to a power module of a power transfer device, wherein the power transfer device is configured to provide power to a plurality of light emitting diode units when connected thereto via electromagnetic induction using a single switch. At 904, a primary induction coil included in the organic light emitting diode unit is aligned with a secondary induction coil included in the power module via magnets respectively included on or within the organic light emitting diode unit and the power module. At 906, the secondary induction coil receives a magnetic flux induced by the primary induction coil. At 908, the magnetic flux is converted to an electric current and at 910, the electric current is used to power an organic light emitting diode of the organic light emitting diode unit.

Example Operating Environment

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 10:
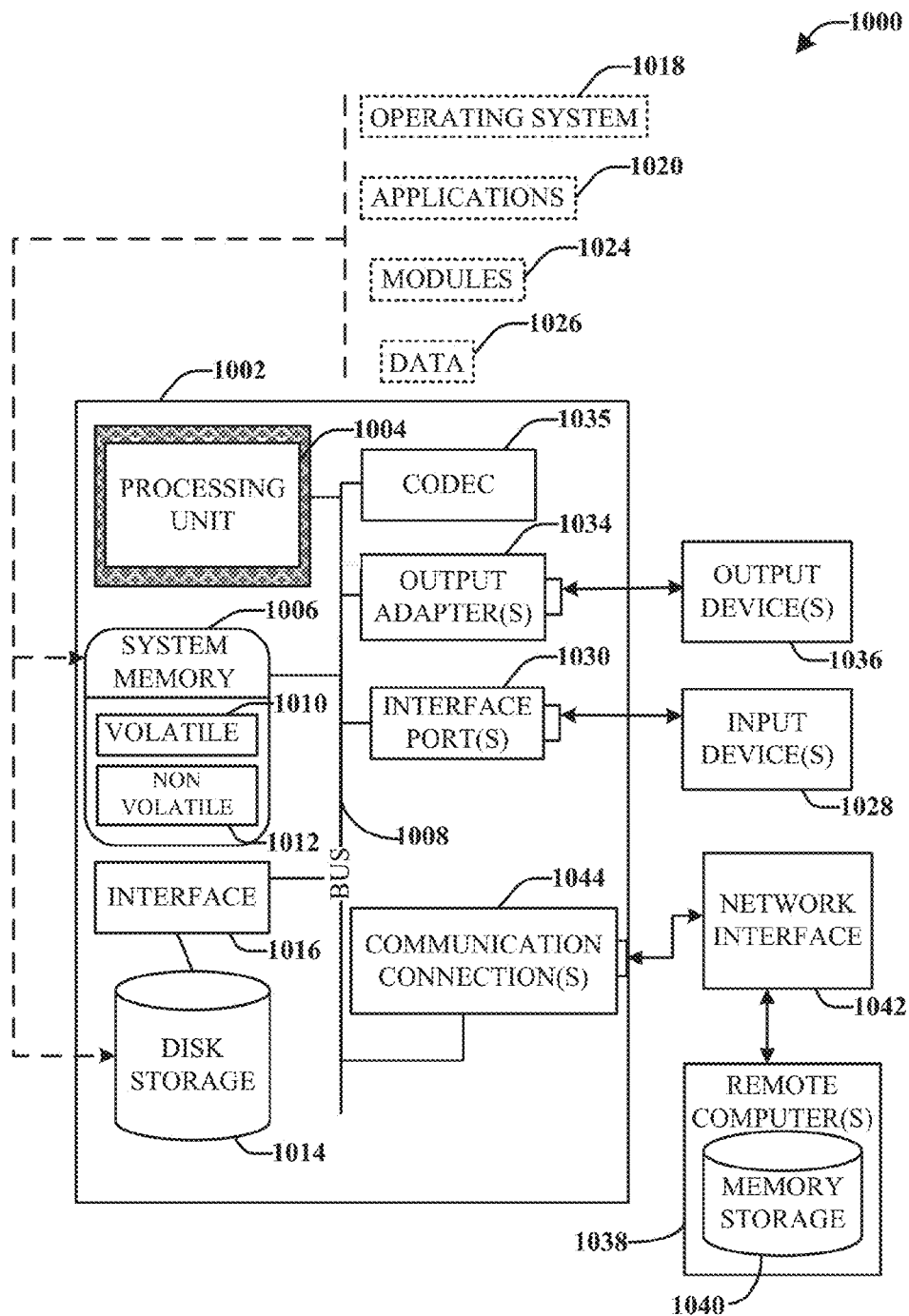
FIG. 10 is a schematic block diagram illustrating a suitable operating environment in accordance with various aspects and embodiments.

With reference to FIG. 10, a suitable environment 1000 for implementing various aspects of the claimed subject matter includes a computer 1002. In an aspect, microprocessors (e.g., $106_1$-$106_N$ and the like) employed in various circuits described herein can include one or more components of computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13104), and Small Computer Systems Interface (SCSI).

The system memory 1006 can include volatile memory 1010 and non-volatile memory 1012. The basic input/output system (BIOS), containing the basic routines to transfer information between elements within the computer 1002, such as during start-up, is stored in non-volatile memory 1012. In addition, according to present embodiments, codec 1005 may include at least one of an encoder or decoder, wherein the at least one of an encoder or decoder may consist of hardware, a combination of hardware and software, or software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s). Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, pointto-point links, circuit switching networks like Integrated Services Digital Networks (ISDN) and variations thereof, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

What has been described above includes examples of the embodiments of the present invention. It is, of course, not possible to describe every conceivable combination of components or methodologies for purposes of describing the claimed subject matter, but it is to be appreciated that many further combinations and permutations of the subject embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the embodiments include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject embodiments may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. An inductive power transfer system, comprising:
   a plurality of transformers electrically coupled to one another in a daisy-chain formation;
   a plurality of power modules operatively coupled to respective ones of the plurality of transformers, wherein respective output voltages of the plurality of transformers are configured to provide power to organic light emitting diode panels in response to respective ones of the organic light emitting diode panels being coupled to respective ones of the plurality of the power modules via respective detachable transformers mechanically and operatively coupled to the respective ones of the organic light emitting diode panels; and
   a single switching module operatively coupled to the plurality of transformers, wherein an output current of the single switching module is configured to drive the inductive power transfer system.

2. The inductive power transfer system of claim 1, wherein the respective output voltages of the plurality of transformers are the same.

3. The inductive power transfer system of claim 1, wherein the output current of the single switching module is configured to drive the inductive power transfer system entirely using an inductor and a capacitor.

4. The inductive power transfer system of claim 3, wherein the single switching module comprises a first switch and a second switch respectively having duty cycles of less than 50%.

5. The inductive power transfer system of claim 4, wherein the capacitor is configured to block direct current flow and create zero voltage switching conditions for the first switch and the second switch, respectively.

6. The inductive power transfer system of claim 1, wherein the respective output voltages of the plurality of transformers are rectified by respective diode bridges and low-pass filters operatively coupled to the respective ones of the plurality of transformers.

7. The inductive power transfer system of claim 1, wherein the organic light emitting diode panels respectively comprise open load protection circuits operatively coupled to the respective detachable transformers and respectively configured to establish short circuit conditions within the respective ones of the organic light emitting diode panels in response to detection of open load conditions associated with the respective ones of the organic light emitting diode panels.

8. The inductive power transfer system of claim 1, wherein the plurality of power modules respectively comprise freewheeling circuits operatively coupled to the respective ones of the plurality of transformers and respectively configured to reduce voltage spikes, facilitate lighting efficiency, and facilitate substantially equal luminance at the respective ones of the organic light emitting diode panels in response to improper alignment between the respective detachable transformers.

9. The inductive power transfer system of claim 8, wherein the plurality of power modules respectively comprise primary windings of the respective detachable transformers and the organic light emitting diode panels respectively comprise secondary windings of the respective detachable transformers, and wherein the freewheeling circuits are respectively configured to activate based on a sensed voltage threshold in the primary windings, respectively, a sensed current threshold in the respective ones of the plurality of power modules, and another sensed current threshold in the freewheeling circuits, respectively.

10. The inductive power transfer system of claim 8, wherein the freewheeling circuits respectively comprise two bipolar junction transistors, two diodes and electrical circuits consisting of a resistor, an inductor, and a capacitor, connected in parallel.

11. The inductive power transfer system of claim 10, wherein the freewheeling circuits respectively comprise microcontrollers configured to control on and off states of the bipolar junction transistors based on detection of the improper alignment between the respective detachable transformers.

12. A device, comprising:
    a housing; and
    a power transfer circuit provided within the housing, the power transfer circuit comprising:
      power modules electrically coupled to one another in series via transformers respectively associated with the power modules, wherein the transformers are configured to distribute an input current between the respective power modules;
      primary windings operatively coupled to respective power modules of the power modules, wherein the input current distributed between the respective power modules is configured to power organic light emitting diode panels via electromagnetic induction when respective panels of the organic light emitting diode panels are electrically coupled to respective primary windings of the primary windings via respective secondary windings included in the respective panels; and a switch network operatively connected to the transformers and configured to control provision of the input current in response to being connected to a power source.

13. The device of claim 12, wherein the transformers are configured to distribute the input current evenly between the respective power modules.

14. The device of claim 12, further comprising:

attachment slots respectively configured to receive the respective panels and facilitate electrically coupling the respective primary windings and the respective secondary windings included in the respective panels.

15. The device of claim 14, further comprising:

magnets configured to magnetically couple with other magnets of the respective panels to facilitate mechanical attachment of the respective panels to respective attachment slots of the attachment slots and to facilitate alignment of the respective primary windings and the respective secondary windings.

16. The device of claim 12, wherein the power transfer circuit further comprises:

freewheeling circuits operatively coupled to the respective power modules and respectively configured to reduce voltage spikes, facilitate lighting efficiency, and facilitate substantially equal luminance at the respective panels in response to improper alignment between the respective primary windings and the respective secondary windings.

17. The device of claim 16, wherein respective freewheeling circuits of the freewheeling circuits are configured to activate based on a sensed voltage threshold in the respective primary windings, a sensed current threshold in the respective transformers, and another sensed current threshold in the respective freewheeling circuits.

18. The device of claim 16, wherein the freewheeling circuits respectively comprise two bipolar junction transistors, two diodes and electrical circuits consisting of a resistor, an inductor, and a capacitor, connected in parallel, and wherein respective freewheeling circuits of the freewheeling circuits comprise a microcontroller configured to control on and off states of the bipolar junction transistors based on detection of the improper alignment.

19. A device, comprising:

a housing;

a light emitting diode attached to or positioned near the housing;

a power circuit provided within the housing and configured to provide power to the light emitting diode when electrically coupled to a power transfer device via electromagnetic induction, the power circuit comprising:

a secondary coil configured to receive a magnetic flux and generate an output voltage to power the light emitting diode in response to connection to a primary coil of the power transfer device, wherein the primary coil of the power transfer device is operatively coupled to a power module, and wherein a current supplied to the power module is shared with at least one other power module electrically connected to the power module via a transformer; and a connection part configured to facilitate mechanical attachment of the device to the power transfer device and to facilitate alignment of the secondary coil relative to the primary coil.

20. The device of claim 19, wherein the power circuit further comprises an open load protection circuit configured to establish a short circuit condition within the power circuit when an open load is detected.

* * * * *